United States Patent [19]
Mastuzawa

[11] Patent Number: 5,983,926
[45] Date of Patent: Nov. 16, 1999

[54] FLOW CONTROL VALVE

[75] Inventor: Hironori Mastuzawa, Nagoya, Japan

[73] Assignee: Advance Denki Kougyou Kabushiki Kaisha, Nayoga, Japan

[21] Appl. No.: 09/141,427

[22] Filed: Aug. 27, 1998

[30] Foreign Application Priority Data

Sep. 10, 1997 [JP] Japan .................................. 9-264935

[51] Int. Cl.⁶ .............................................. F16K 31/12
[52] U.S. Cl. ............................ 137/500; 137/85; 137/501
[58] Field of Search ................................. 137/500, 501, 137/85

[56] References Cited

U.S. PATENT DOCUMENTS 3,215,159  11/1965  Nixon ...................................... 137/501
4,084,612  4/1978  Baehr ...................................... 137/484.2

Primary Examiner—Steven O. Douglas
Assistant Examiner—Timothy L. Maust
Attorney, Agent, or Firm—Nikaido, Marmelstein, Murray & Oram LLP

[57] ABSTRACT

A first pressure chamber and a second pressure chamber are provided with means for continuously exerting a constant inward pressure on a first diaphragm part and a third diaphragm part respectively. A valve chamber having a flow control portion wherein a flow rate of the controlled fluid flowing from an inflow chamber to an outflow chamber is controlled by changing a size of the opening defined between a valve part and a valve seat, caused by a displacement of the valve part of a valve mechanism. A differential pressure chamber connects with the outflow chamber and has a bypass opening of a bypass passage connecting to the outflow passage.

6 Claims, 3 Drawing Sheets

5,983,926

FLOW CONTROL VALVE

BACKGROUND OF THE INVENTION

1. Field of the Invention

The present invention relates to a control valve for controlling a flow rate of fluid (liquid or gas) to be constant, and especially relates to a flow control valve for controlling a constant flow rate by absorbing not only pressure fluctuations on the primary side (inflow side) but also load fluctuations on the secondary side (outflow side).

2. Description of the Related Art

The inventor of the present invention has proposed a fluid control valve using diaphragms, in Japanese Unexamined Patent Publication (Kokai) No. 6-295209, in which the flow rate on the secondary side (outflow side) can be kept constant in response to the pressure fluctuation on the primary side (inflow side). The invention was patented as Japanese Patent No. 2671183.

The fluid control valve 100 of the prior invention, shown in FIG. 3, is comprised of a body 110 having an inflow part 111 and an outflow part 112, and a valve body 120 having a valve part 121, a first diaphragm part 122 and a second diaphragm part 123. The chamber of the body 110 is divided, by the first diaphragm part 122 and the second diaphragm part 123, into a first pressure chamber 131, a valve chamber 130, and a second pressure chamber 132. The first pressure chamber 131 and the second pressure chamber 132 are always under constant pressure so as to exert inward pressure on the first diaphragm part 122 and the second diaphragm part 123 from the outside. Numbers 136 and 137 designate passages of pressurized gas.

According to the fluid control valve 100 of the prior invention, the pressure fluctuation on the inflow part 111 side (primary side) produces a fluctuation of the outward pressure which acts on the first and the second diaphragm parts 122 and 123 that are continuously subject to constant inward pressure. Consequently a displacement of the valve body 120 occurs to keep a balance between the constant inward force and the fluctuating outward pressure on the primary side. The displacement of the valve body 120 causes the valve part 121 to move, so that the valve opening changes to thereby control the flow rate.

The prior invention has a great advantage that a quick response to an instant pressure variation or pulsation to which conventional mechanical or electrical means could not quickly respond can be provided, using a valve body having two diaphragm parts. Also, since the structure is simple, installation and maintenance thereof can be advantageously facilitated.

However, the prior invention does not have a function to respond to the load fluctuation on the outflow side, i. e., the secondary side. Accordingly, it is not responsive, for example, to an influence by mixing with another fluid on the secondary side, or a load fluctuation caused by a change in the viscosity of the fluid, due to a temperature change.

SUMMARY OF THE INVENTION

The object of the present invention is to provide a novel flow control valve which can be easily installed and maintained and which can instantaneously respond to load fluctuations not only on the primary side, but also on the secondary side to thereby maintain a constant rate of flow. Another object of the invention is to provide a simple flow control valve which can instantaneously respond to an instant load fluctuation or a pulsation, by the employment of a diaphragm mechanism without using a complex and expensive mechanical or electrical mechanism.

According to the present invention, there is provided a flow control valve comprising, a body formed with an inflow passage and an outflow passage of fluid to be controlled;

a chamber formed with an inflow opening of the inflow passage and an outflow opening of the outflow passage of the fluid; and a valve mechanism provided with a valve part, a first diaphragm part, a second diaphragm part and a third diaphragm part which has a smaller effective sectional surface area than that of said second diaphragm part, said diaphragm parts being secured to said body at the peripheral portions thereof and attached in said chamber, and said chamber being divided by the diaphragm parts into a first pressure chamber, a valve chamber, a differential pressure chamber and a second pressure chamber, in this order, said first pressure chamber being provided with a means for continuously exerting a constant inward pressure on said first diaphragm part, said valve chamber being provided with a valve seat corresponding to a valve part of the valve mechanism, said valve chamber defining an inflow chamber having an inflow opening of the fluid to be controlled on the first diaphragm side and an outflow chamber having an outflow opening of the fluid on the second diaphragm side thereof in connection with the valve seat, and said valve chamber having a flow control portion wherein a flow rate of the controlled fluid flowing from the inflow chamber to the outflow chamber is controlled by changing the size of the opening defined between the valve part and the valve seat, caused by the displacement of the valve part, said differential pressure chamber connecting with the outflow chamber of the valve chamber through a connecting passage portion formed on the second diaphragm part, and having a bypass opening of a bypass passage connecting to the outflow passage, and said second pressure chamber being provided with a means for continuously exerting a constant inward pressure on the third diaphragm part.

DESCRIPTION OF THE PREFERRED EMBODIMENTS

Figure 1:
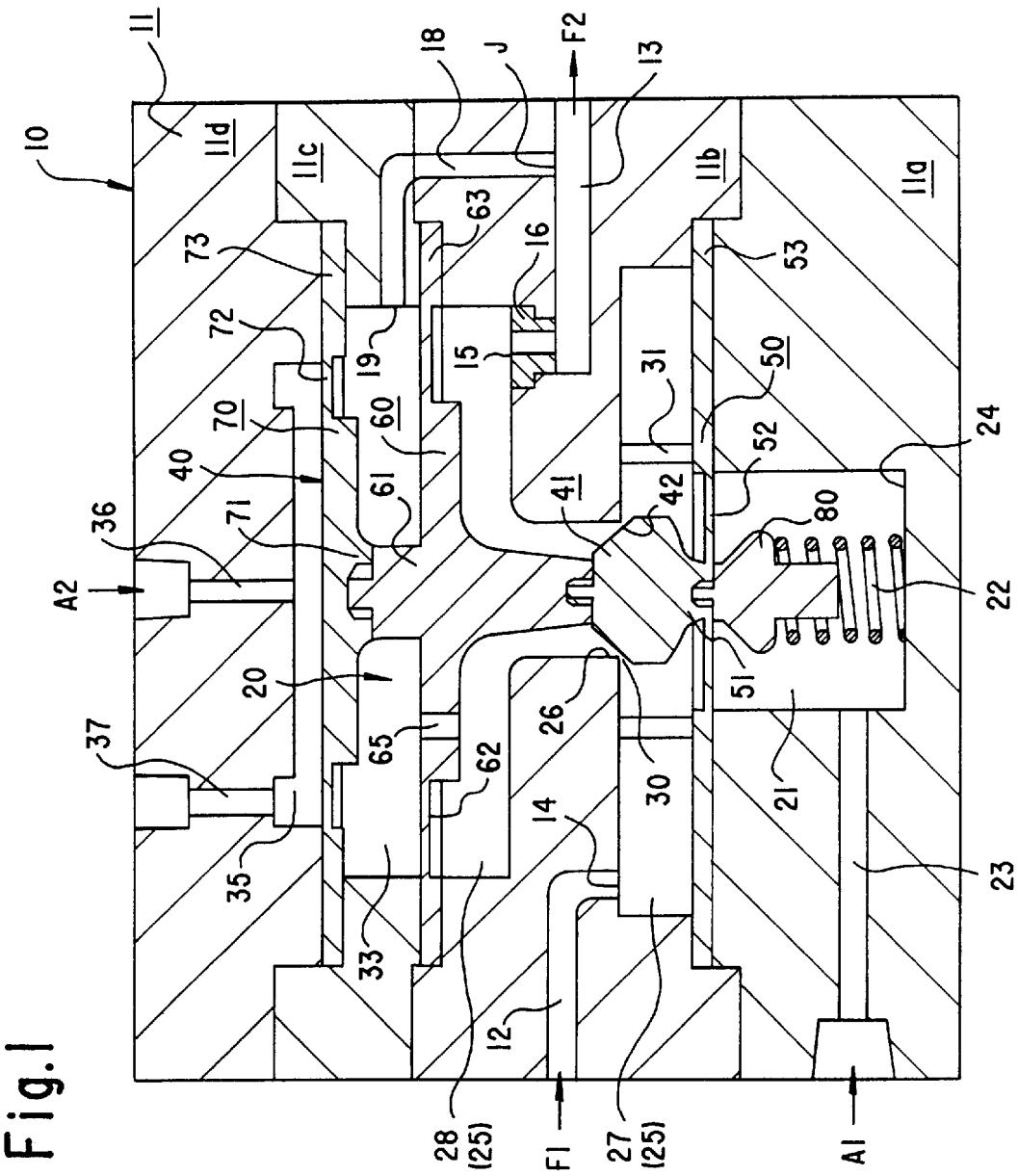
FIG. 1 is a longitudinal sectional view showing an embodiment of a control valve of the present invention.
Figure 2:
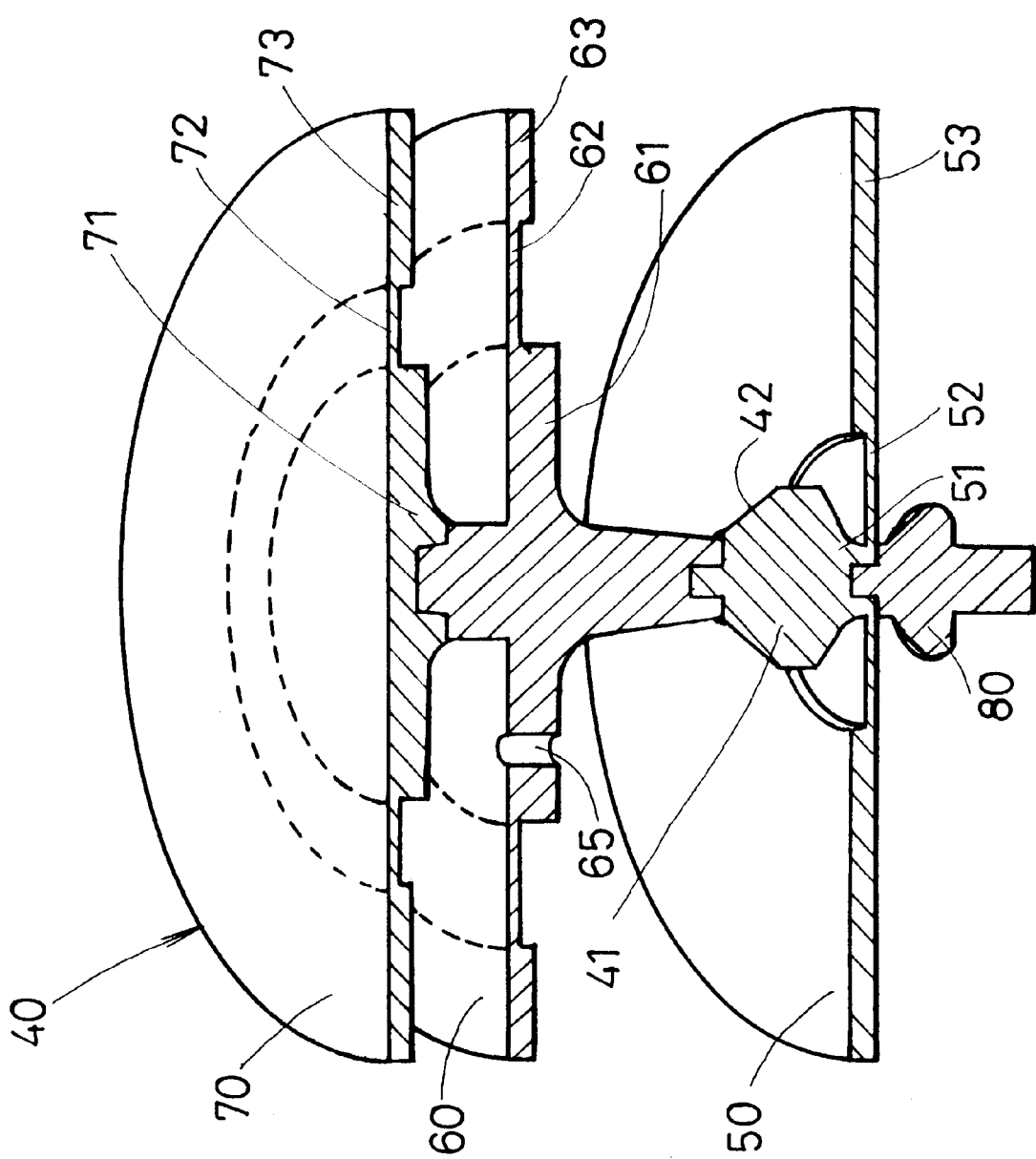
FIG. 2 is a partially broken perspective view of a valve mechanism.
Figure 3:
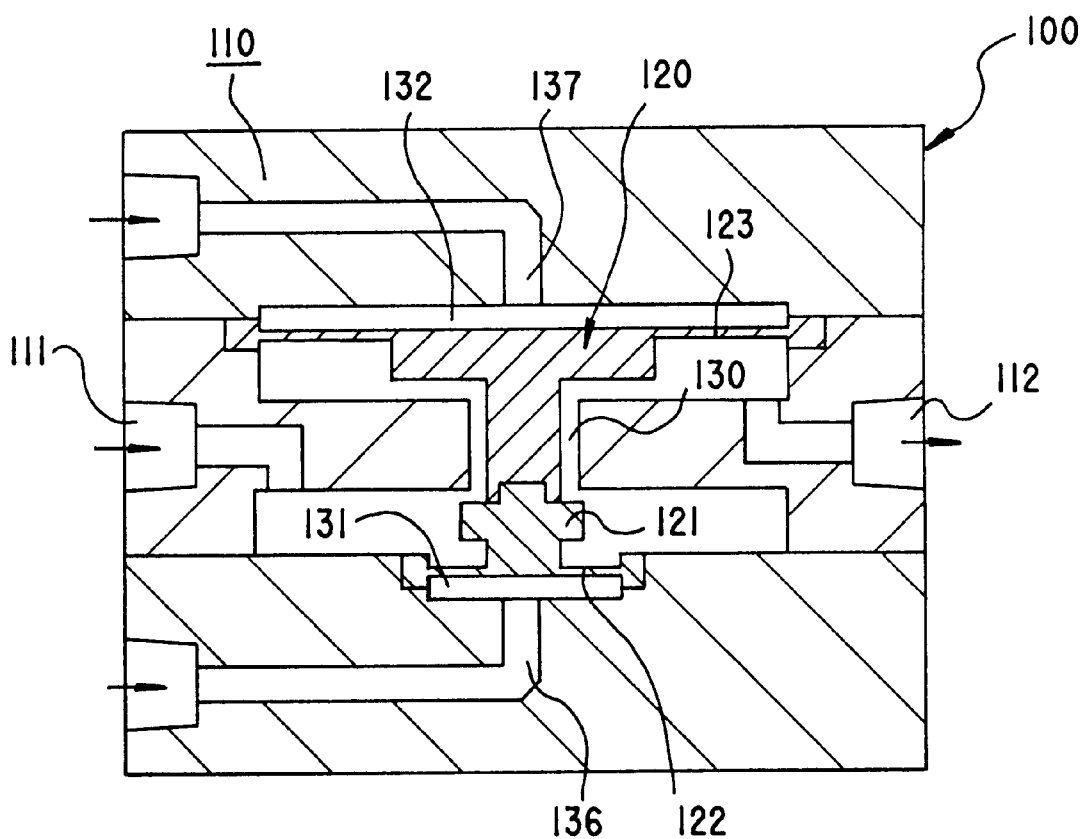
FIG. 3 is a longitudinal sectional view of a control valve of a prior invention of the present inventor.

The present invention will be explained in detail below according to the attached drawings. FIG. 1 is a longitudinal sectional view of an embodiment of a flow control valve of the present invention. FIG. 2 is a partially broken perspective view of the valve mechanism of the flow control valve.

As shown in FIG. 1, a flow control valve 10 of the present invention includes a body 11, a chamber 20 formed in the body 11, and a valve mechanism 40 placed in the chamber 20.

The body 11 is made of a resin having high corrosion resistance and high chemical resistance such as fluororesin, and is provided with an inflow passage 12 and an outflow passage 13 for fluid to be controlled. The body 11 in the illustrated embodiment is divided into a first block 11a, a second block 11b, a third block 11c, and a fourth block 11d, and is constituted by integrally assembling them.

The body 11 has one chamber 20 as a whole. An inflow opening 14 of the inflow passage 12 for the fluid to be controlled is formed on one side of the chamber 20, and an outflow opening 15 of an outflow passage 13 is formed on the other side thereof.

As shown in the drawings, it is preferable that an orifice 16 having an appropriate aperture size be provided in the outflow opening 15. This is because the outflow opening 15 functions as a restricting portion to detect a load fluctuation on the secondary side, and a desired size of the restricting portion can be selected by attaching the orifice 16.

Similarly to the body 11, the valve mechanism 40 is made of a resin having high corrosion resistance and high chemical resistance, such as fluororesin, and, as can be clearly seen in FIG. 2, is provided with a valve part 41, a first diaphragm part 50, a second diaphragm part 60 and a third diaphragm part 70. Normally, these parts are processed and manufactured separately, and are thereafter assembled and secured. In the illustrated embodiment, the valve part 41 and the first diaphragm part 50 are formed integrally, the second diaphragm part 60 is screwed on and secured to the valve part 41, and the third diaphragm part 70 is screwed on and secured to the second diaphragm part 60, so that a single valve mechanism 40 is constituted. Number 80 in the drawing is a spring receptacle part for a spring 22 which can be provided in a first pressure chamber 21, which will be discussed hereinafter, is screwed in and secured to the first diaphragm part 50. The spring seat 80 is not necessary when no spring is used.

Each element of the valve mechanism 40 will be explained below.

As described below, the valve part 41 is provided close to but spaced from the valve seat 26 of the valve chamber 25, so as to constitute a flow control portion 30 for controlling the opening formed therebetween. The valve part 41 is provided with a tapered surface 42 which contributes to a linear control of the flow control portion 30.

The first diaphragm part 50 is provided with a body 51 integrally formed with the valve part 41. The body 51 is equipped, on the outer periphery thereof, with a movable thin portion 52 which defines a diaphragm surface. A peripheral portion 53 is formed on the outer periphery of the movable thin portion. In the embodiment, since the diaphragm parts 50, 60 and 70 have an identical diameter for the sake of convenience in manufacturing, the peripheral portion 53 of the first diaphragm 50 is larger.

The second diaphragm part 60 is connected and secured to the valve part 41 at the central main portion 61. A connecting passage portion 65 is formed in the main portion 61. A movable thin portion 62, which defines a diaphragm surface, is provided on the periphery of the main portion 61, and a periphery portion 63 is provided on the outer periphery thereof.

The third diaphragm part 70 is connected and secured to the main portion 61 of the second diaphragm part at the central main portion 71, and has a movable thin portion 72, which defines a diaphragm surface, on the periphery of the main portion, and a peripheral portion 73 on the outer periphery thereof. The diameter of the movable thin portion 72 (i. e., diaphragm effective sectional surface area) of the third diaphragm part 70 is smaller than the diameter of the movable thin portion 62 (i. e., diaphragm effective sectional surface area) of the second diaphragm part 60. Due to the smaller diaphragm effective sectional surface area of the third diaphragm part 70 than that of the second diaphragm part 60, the second diaphragm part 60 operates prior to the third diaphragm part 70.

The diaphragm parts 50, 60 and 70 are secured to the body 11 at their peripheral portions 53, 63 and 73, respectively and are attached to the chamber 20. In the embodiment, as shown in the drawings, the diaphragm parts are held and secured between the first block 11a and the second block 11b, between the second block 11b and the third block 11c and between the third block 11c and the fourth block 11d, respectively. The blocks constitute the body 11. By attaching the diaphragm parts 50, 60 and 70, the chamber 20 is divided into a first pressure chamber 21, a valve chamber 25, a differential pressure chamber 33 and a second pressure chamber 35, in this order. Each chamber will be further explained below.

The first pressure chamber 21 is provided with a means for continuously exerting a constant inward force (the first set pressure) on the first diaphragm part 50. In the embodiment, the spring 22 having a predetermined spring constant is provided between the bottom portion 24 of the first pressure chamber 21 and the spring seat 80 attached to the first diaphragm part 50. Moreover, the first set pressure is provided by the first pressurized air A1 supplied through a pressurized air passage 23. The pressure means (not shown) can be either one of the spring and the pressurized air. When only the spring is used, although not shown, it is preferable that a spring retainer be screwed so as to realize a load adjustable spring device.

The valve chamber 25 has the valve seat 26 corresponding to the valve part 41 of the valve mechanism 40. In the embodiment, a corner of the second block 11b of the body 11 functions as the valve seat 26. The valve chamber 25 is comprised of an inflow chamber 27 having a fluid inflow opening 14 on the first diaphragm 50 side, and an outflow chamber 28 having a fluid outflow opening 15 on the second diaphragm 60 side thereof in connection with the valve seat. The valve chamber 25 has a flow control portion 30 which controls, as the movement of the valve part 41 changes the size of the opening defined between the valve seat 26 and the valve part, the flow rate of the fluid to be controlled flowing from the inflow chamber 27 to the outflow chamber 28.

Number 31 in the valve chamber 25 is a stay which holds the peripheral portion 53 of the first diaphragm part 50.

The differential pressure chamber 33 can be connected with the outflow chamber 28 of the valve chamber 25 through the connecting passage portion 65 formed on the second diaphragm part 60, and has a bypass opening 19 of a bypass passage 18 which is connected to the outflow passage 13 at the junction J. When the outflow chamber 28 and the differential pressure chamber 33 are connected, no fluid is resident in the differential pressure chamber 33.

The second pressure chamber 35 has a means for continuously exerting a constant inward force (a second set force) on the third diaphragm part 70. In the embodiment, as shown in the drawings, the second set pressure is produced by the second pressurized air A2. In the second pressure chamber 35, 36 is a pressurized air passage, and 37 is a discharge passage thereof. The pressure device is not shown. As described before, a load adjustable spring device can be used for the pressurizing means.

The action of the flow control valve of the present invention will be explained.

According to the present invention, the first set pressure and the second set pressure are always applied inwardly to the valve mechanism 40 through the first diaphragm part 50 and the third diaphragm part 70 by the pressurizing means of the first pressure chamber 21 and the second pressure chamber 35. In a normal position, the first set pressure and the second set pressure are set to be balanced when the fluid is at a predetermined flow rate, and the size of the opening of the flow control portion 30 defined between the valve part 41 of the valve mechanism 40 and the valve seat 26 of the valve chamber 25 is kept constant. Accordingly, a predetermined rate of flow of the fluid to be controlled inflowing from the inflow side (primary side) through the inflow opening 14 to the valve chamber 25 outflows through the outflow opening 15 to the outflow side (secondary side).

If change occurs in the fluid to be controlled on the inflow side (primary side), the change causes the pressure on the primary side to vary, thus resulting in an occurrence of a change in the pressure on the third diaphragm part 70 of the valve mechanism 40 to which the set pressure is applied. Thus, the valve mechanism 40 moves to keep balance between the fluctuated outward pressure on the primary side and the inward set pressure. The movement of the valve mechanism body 40 is followed by the movement of the valve part 41, so that the opening of the flow control portion 30 can be controlled to thereby control the flow rate.

On the other hand, the load fluctuation on the outflow side (secondary side) causes the pressure on the outflow side to change. The change is transmitted to the differential pressure chamber 33 through the bypass passage 18 which is connected to the outflow passage 13 at the junction J. Although the second diaphragm part 60 and the third diaphragm part 70 are present in the differential pressure chamber 33, since the diaphragm effective sectional surface area of the second diaphragm part 60 is larger than that of the third diaphragm part 70, the pressure acting on the second diaphragm 60 fluctuates. Consequently, displacement of the valve mechanism 40 takes place, thus leading to the movement of the valve part 41, so that the opening of the flow control portion 30 changes and the flow rate is controlled.

Of course, since the valve mechanism 40 is always subject to the inward set pressure from the outside through the first diaphragm part 50 and the third diaphragm part 70, the pressure fluctuation absorbed on the secondary side can be within a set range of pressure.

As described above, since supplemental compensational displacement of the second diaphragm part 60 occurs within the range of the constant set pressure applied to the fist diaphragm part 50 and the third diaphragm part 70 of the valve mechanism body 40, the flow control valve 10 of the present invention can respond to pressure fluctuations on the primary side, absorb pressure fluctuations on the secondary side, and move the valve part 41, to thereby perform a precise flow control.

As shown and described above, according to the fluid control valve of the present invention, the flow rate can be kept constant by instantaneously responding not only to load fluctuations on the primary side but also to load fluctuations on the secondary side. Thus, it is possible to instantaneously respond to a pressure change occurring on the inflow part, i. e., the primary side, or a load fluctuation occurring on the outflow side, i. e., secondary side, for example, upon mixing with another fluid, or a temperature change accompanying the change in fluid viscosity.

Also, according to the mechanism of the present invention, it is possible to quickly respond to an instantaneous load fluctuation or a pulsation, by adopting the diaphragm mechanism. Further, since no complex nor expensive mechanical or electrical mechanism is required, the mechanism is simple, and a flow control valve which can be easily installed or maintained can be obtained.

What is claimed is:

1. A flow control valve comprising
a body formed with an inflow passage and an outflow passage of fluid to be controlled;
a chamber formed with an inflow opening of the inflow passage and an outflow opening of the outflow passage of the fluid; and
a valve mechanism provided with a valve part, a first diaphragm part, a second diaphragm part and a third diaphragm part which has a smaller effective sectional surface area than that of said second diaphragm part, said diaphragm parts being secured to said body at the peripheral portions thereof and attached in said chamber, and said chamber being divided by the diaphragm parts into a first pressure chamber, a valve chamber, a differential pressure chamber and a second pressure chamber, in this order,
said first pressure chamber being provided with a means for continuously exerting a constant inward pressure on said first diaphragm part,
said valve chamber being provided with a valve seat corresponding to a valve part of the valve mechanism, said valve chamber defining an inflow chamber having an inflow opening of the fluid to be controlled on the first diaphragm side and an outflow chamber having an outflow opening of the fluid on the second diaphragm side thereof in connection with the valve seat, and said valve chamber having a flow control portion wherein a flow rate of the controlled fluid flowing from the inflow chamber to the outflow chamber is controlled by changing the size of the opening defined between the valve part and the valve seat, caused by the displacement of the valve part,
said differential pressure chamber being capable or connecting with the outflow chamber of the valve chamber through a connecting passage portion formed on the second diaphragm part, and having a bypass opening of a bypass passage connecting to the outflow passage, and
said second pressure chamber being provided with a means for continuously exerting a constant inward pressure on the third diaphragm part.

2. A flow control valve according to claim 1, wherein the outflow opening is an orifice.

3. A flow control valve according to claim 1 or 2, wherein the pressurizing means of the first pressure chamber and the second pressure chamber is provided by a pressurized gas.

4. A flow control valve according to claim 1 or 2, wherein the pressurizing means of the first pressure chamber and the second pressure chamber is comprised of a load adjustable spring apparatus.

5. A flow control valve according to claim 1, wherein the body and the valve mechanism are made of fluororesin.

6. A flow control valve according to claim 1, wherein the valve is formed of a tapered surface.

* * * * *